United States Patent
Suciu et al.

(10) Patent No.: US 10,215,101 B2
(45) Date of Patent: Feb. 26, 2019

(54) INTEGRATED ENVIRONMENTAL CONTROL SYSTEM MANIFOLD

(71) Applicant: UNITED TECHNOLOGIES CORPORATION, Farmington, CT (US)

(72) Inventors: Gabriel L. Suciu, Glastonbury, CT (US); Jesse M. Chandler, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 361 days.

(21) Appl. No.: 15/118,565

(22) PCT Filed: Sep. 18, 2014

(86) PCT No.: PCT/US2014/056200
§ 371 (c)(1),
(2) Date: Aug. 12, 2016

(87) PCT Pub. No.: WO2015/122934
PCT Pub. Date: Aug. 20, 2015

(65) Prior Publication Data
US 2017/0044991 A1 Feb. 16, 2017

Related U.S. Application Data

(60) Provisional application No. 61/940,143, filed on Feb. 14, 2014.

(51) Int. Cl.
*F02C 9/18* (2006.01)
*F01D 25/16* (2006.01)
(Continued)

(52) U.S. Cl.
CPC .............. *F02C 9/18* (2013.01); *F01D 25/162* (2013.01); *F01D 25/24* (2013.01); *F02C 6/08* (2013.01);
(Continued)

(58) Field of Classification Search
CPC ...... F02C 9/18; F02C 6/08; F02C 7/28; F02C 7/05; F02C 7/052; F01D 25/162;
(Continued)

(56) References Cited

U.S. PATENT DOCUMENTS 6,698,180 B2 * 3/2004 Snyder .................. B01D 45/08
137/15.1
9,797,312 B2 * 10/2017 Johnsson ................ F01D 9/065
(Continued)

FOREIGN PATENT DOCUMENTS

WO 2013165281 A1 11/2013

OTHER PUBLICATIONS

International Search Report and Written Opinion for International Application No. PCT/US2014/056200 dated Dec. 19, 2014.
(Continued)

*Primary Examiner* — Jason Shanske
*Assistant Examiner* — Sabbir Hasan
(74) *Attorney, Agent, or Firm* — Cantor Colburn LLP

(57) ABSTRACT

A compressor intermediate case for a gas turbine engine includes a plurality of intermediate case struts joining the compressor intermediate case to an inner engine structure. Each strut of the plurality of intermediate case struts includes a leading edge. A turning scoop is disposed at the leading edge of each strut of the plurality of intermediate case struts. A plurality of diffusers extends radially outwardly from the compressor intermediate case so that each diffuser of the plurality of diffusers engages with a corresponding turning scoop. A substantially annular structural
(Continued)

fire wall extends radially outwardly from the compressor intermediate case. An environmental control system manifold is disposed on the compressor intermediate case. The environmental control system manifold includes an exit port.

20 Claims, 6 Drawing Sheets

(51) Int. Cl.
    *F01D 25/24*     (2006.01)
    *F04D 29/52*     (2006.01)
    *F04D 29/54*     (2006.01)
    *F04D 29/58*     (2006.01)
    *F02C 6/08*     (2006.01)
    *F02C 7/25*     (2006.01)
    *F04D 29/70*     (2006.01)
    *F02C 7/052*     (2006.01)

(52) U.S. Cl.
    CPC .............. *F02C 7/25* (2013.01); *F04D 29/522* (2013.01); *F04D 29/542* (2013.01); *F04D 29/5853* (2013.01); *F04D 29/701* (2013.01); *F02C 7/052* (2013.01); *F05D 2220/32* (2013.01); *F05D 2240/15* (2013.01)

(58) Field of Classification Search
    CPC ....... F01D 25/24; F01D 17/105; B64D 13/06; B64D 2013/0603
    See application file for complete search history.

(56) References Cited

U.S. PATENT DOCUMENTS

| | | |
|---|---|---|
| 2008/0014083 A1 | 1/2008 | Eleftheriou et al. |
| 2010/0068043 A1 | 3/2010 | Shteyman et al. |
| 2011/0173990 A1 | 7/2011 | Theis |
| 2012/0159966 A1 | 6/2012 | Suciu et al. |
| 2012/0288366 A1 | 11/2012 | Merry et al. |

OTHER PUBLICATIONS

European Search Report for Application No. EP 14 88 2642.

\* cited by examiner

INTEGRATED ENVIRONMENTAL CONTROL SYSTEM MANIFOLD

This application is a National Phase Application of Patent Application PCT/US2014/056200 filed on Sep. 18, 2014, which claims the benefit of and priority to U.S. Provisional Patent Application Ser. No. 61/940,143, filed on Feb. 14, 2014, the contents each of which are incorporated herein by reference in their entirety.

TECHNICAL FIELD

The subject matter of the present disclosure relates generally to gas turbine engines and, more particularly, relates to air distribution through a gas turbine engines.

BACKGROUND

Gas turbine engines may include a low pressure compressor and a high pressure compressor. In many engine configurations, a low pressure compressor case surrounds the low pressure compressor and a high pressure compressor case surrounds the high pressure compressor with a compressor intermediate case located therebetween. The area located between the low pressure compressor case and the high pressure compressor case is commonly referred to as station 2.5. Station 2.5 generally includes a 2.5 bleed path through the compressor intermediate case to allow air to bleed into the fan stream. In addition to relieving pressure when the engine is at idle or low power, the 2.5 bleed path also allows dirt particles from the low pressure compressor discharge air to exit into the fan stream, so that cleaner air passes downstream through the core engine. The 2.5 bleed path is traditionally regulated by a 2.5 bleed valve that controls the amount of bleed air flowing to the fan stream. In many configurations, the 2.5 bleed valve is located in the core compartment to facilitate maintenance.

An environmental control system bleed path may also be implemented in gas turbine engines. The environmental control system bleed path guides the air to the environmental control system for supplying air to the cabin of an aircraft. Conventional environmental control system bleed paths are usually sourced from the middle section of the high pressure compressor. While effective, the environmental control system air sourced from the middle section of the high pressure compressor may contain dirt particles that were not diverted through the 2.5 bleed path. However, cleaner environmental control system bleed air is desirable because this air eventually circulates throughout the aircraft cabin and is breathed in by the passengers.

Accordingly, there is a need to provide cleaner environmental control system bleed air into the aircraft cabin such as by sourcing this air from station 2.5 immediately downstream of the 2.5 bleed path so that there is minimal disruption to the core air flow.

SUMMARY

In accordance with an aspect of the disclosure, an intermediate case for a gas turbine engine compressor is provided. The intermediate case may include a plurality of intermediate case struts joining the intermediate case to an inner engine structure. Each strut of the plurality of intermediate case struts includes a leading edge. A turning scoop may be disposed at the leading edge of each strut of the plurality of intermediate case struts. A plurality of diffusers may extend radially outwardly from the intermediate case so that each diffuser of the plurality of diffusers may be engaged with a corresponding turning scoop. A substantially annular structural fire wall may extend radially outwardly from the intermediate case. An environmental control system manifold may be disposed on the intermediate case. The environmental control system manifold may include an exit port.

In accordance with another aspect of the disclosure, a non-structural fairing may extend radially outwardly from the intermediate case. The non-structural fairing may be disposed upstream of the annular structural fire wall to define a 2.5 bleed duct therebetween.

In accordance with yet another aspect of the disclosure, a 2.5 stability bleed valve may be in operable association with the non-structural fairing and the 2.5 bleed duct. The 2.5 stability bleed valve may be operably movable between an open and closed position.

In accordance with still yet another aspect of the disclosure, the 2.5 bleed duct may be arranged to the intermediate case forming a first dirt separator.

In further accordance with another aspect of the disclosure, the turning scoop may include an upstream-facing scoop inlet. The scoop inlet may be offset substantially radially inwardly from the intermediate case forming a second dirt separator.

In further accordance with yet another aspect of the disclosure, the environmental control system manifold may be asymmetrical.

In further accordance with still yet another aspect of the disclosure, the environmental control system manifold may be formed of a substantially annular first and second collection wall. The first collection wall may extend substantially radially outwardly from the intermediate case. The second collection wall may extend downstream substantially axially from the structural fire wall. The first and second collection walls intersect to form a smooth bend. The exit port may be disposed on the first collection wall. The second collection wall may extend a first distance from the fire wall adjacent to the exit port and tapers moving along its circumference until it reaches an area oppositely positioned across the intermediate case, where the second collection wall may extend a second distance from the fire wall that is less than the first distance. The first collection wall may extend a third distance from the intermediate case adjacent the exit port and tapers moving along its circumference until it reaches the area oppositely positioned across the intermediate case, where the first collection wall may extend a fourth distance from the intermediate case that is less than the third distance.

In accordance with another aspect of the disclosure, a gas turbine engine is provided. The gas turbine engine may include a compressor intermediate case. A plurality of intermediate case struts may join the compressor intermediate case to an inner engine structure. Each strut of the plurality of intermediate case struts includes a leading edge. A turning scoop may be disposed at the leading edge of each strut of the plurality of intermediate case struts. A plurality of diffusers may extend radially outwardly from the compressor intermediate case so that each diffuser of the plurality of diffusers may be engaged with a corresponding turning scoop. A substantially annular structural fire wall may extend radially outwardly from the compressor intermediate case. An environmental control system manifold may be disposed on the compressor intermediate case. The environmental control system manifold may include an exit port.

In accordance with still another aspect of the disclosure, a V-groove may be disposed on the structural fire wall. The V-groove securely interfaces with a core engine cowl.

In accordance with still yet another aspect of the disclosure, a plurality of guide vanes may be disposed upstream of each scoop inlet.

In accordance with another aspect of the disclosure, a method of providing cleaner environmental control system bleed air, which exits a gas turbine engine, so that there is minimal disruption to a core air flow is provided. The method entails joining a plurality of intermediate case struts between a compressor intermediate case and an inner engine structure. Each strut of the plurality of intermediate case struts includes a leading edge. Another step may be disposing a turning scoop at the leading edge of each strut of the plurality of intermediate case struts. Yet another step may be providing a plurality of diffusers extending radially outwardly from the compressor intermediate case. Each diffuser of the plurality of diffusers engages with a corresponding turning scoop. Still yet another step may be providing a substantially annular structural fire wall extending radially outwardly from the compressor intermediate case. A further step may be providing a non-structural fairing extending radially outwardly from the compressor intermediate case. The non-structural fairing is disposed upstream of the annular structural fire wall to define a 2.5 bleed duct therebetween. Still a further step may be providing an environmental control system manifold on the compressor intermediate case. The environmental control system manifold includes an exit port.

In accordance with yet another aspect of the disclosure, the method may include providing an upstream-facing scoop inlet onto the turning scoop so that the scoop inlet is offset substantially radially inwardly from the compressor intermediate case, forming a second dirt separator.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential" are generally used with respect to the longitudinal central engine axis.

Figure 1:
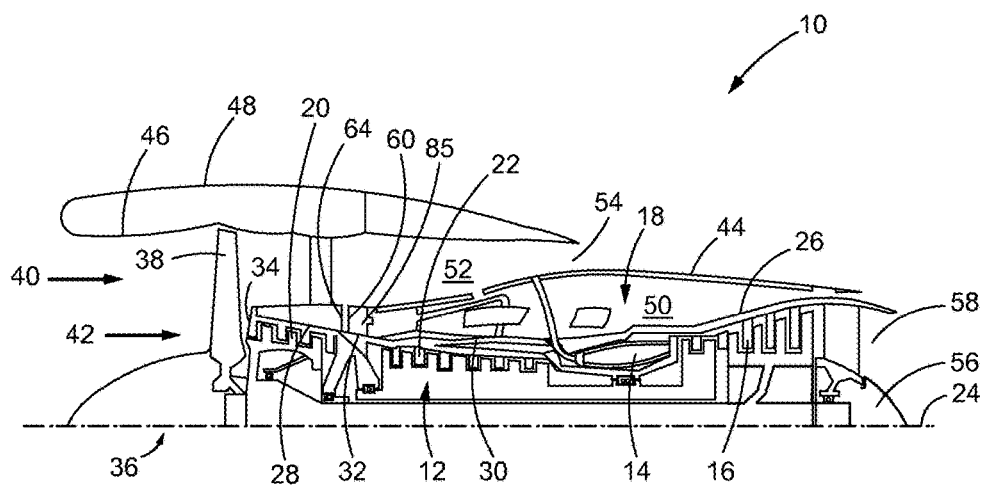
FIG. 1 is a side view of a gas turbine engine with portions sectioned and broken away to show details of the present disclosure.

Referring now to FIG. 1, a gas turbine engine constructed in accordance with the present disclosure is generally referred to by reference numeral 10. The gas turbine engine 10 includes a compressor section 12, a combustor 14 and a turbine 16. The serial combination of the compressor section 12, the combustor 14 and the turbine 16 is commonly referred to as a core engine 18. The compressor section 12 includes a low pressure compressor 20 and a high pressure compressor 22, which is downstream of the low pressure compressor 20. The engine 10 is circumscribed about a longitudinal central axis 24.

A core engine case 26 surrounds the core engine 18. The core engine case 26 is formed, in part, from a low pressure compressor case 28, which mainly surrounds the low pressure compressor 20, and a high pressure compressor case 30, which mainly surrounds the high pressure compressor 22. A compressor intermediate case 32 is located between the low pressure compressor case 28 and the high pressure compressor case 30, joining the cases 28, 30 together. Alternatively, the high pressure compressor case 30 and the compressor intermediate case 32 may form a single case.

Air enters the compressor section 12 at the compressor inlet 34 and is pressurized. The pressurized air then enters the combustor 14. In the combustor 14, the air mixes with jet fuel and is burned, generating hot combustion gases that flow downstream to the turbine 16. The turbine 16 extracts energy from the hot combustion gases to drive the compressor section 12 and a fan 36, which includes a plurality of airfoils 38 (one shown in FIG. 1). As the turbine 16 drives the fan 36, the airfoils 38 rotate so as to take in more ambient air. This process accelerates the ambient air 40 to provide the majority of the useful thrust produced by the engine 10. Generally, in some modern gas turbine engines, the fan 36 has a much greater diameter than the core engine 18. Because of this, the ambient air flow 40 through the fan 36 can be 5-10 times higher, or more, than the core air flow 42 through the core engine 18. The ratio of flow through the fan 36 relative to flow through the core engine 18 is known as the bypass ratio.

The fan 36 and the core engine cowl 44, which surrounds the core engine 18, are surrounded by a fan cowl 46 forming part of a nacelle 48. A core compartment 50 is functionally defined by the area between core engine case 26 and the core engine cowl 44. A fan duct 52 is functionally defined by the area between the core engine cowl 44 and the nacelle 48.

The fan duct 52 is substantially annular in shape so that it can accommodate the air flow produced by the fan 36. This air flow 40 travels the length of the fan duct 52 and exits downstream at a fan nozzle 54. A tail cone 56 may be provided at the core engine exhaust nozzle 58 to smooth the discharge of excess hot combustion gases that were not used by the turbine 16 to drive the compressor section 12 and the fan 36.

As best seen in FIGS. 2-7, a structural fire wall 60 extends radially outwardly from the compressor intermediate case 32 to the core engine cowl 44 (shown in FIG. 1). The structural fire wall 60 may be substantially annular and includes a V-groove 62 disposed along its outer rim adjacent to the core engine cowl 44. The V-groove 62 securely interfaces with the core engine cowl 44. The V-groove is designed to support the core engine cowl 44.

A non-structural fairing wall 64 also extends radially outwardly from the compressor intermediate case 32, at a location upstream of the structural fire wall 60, to the core engine cowl 44. The non-structural fairing wall 64 is offset axially from the structural fire wall so that a 2.5 bleed duct 66 is defined therebetween. The compressor intermediate case 32 is arranged at this location to allow portions of the core air flow 42 (also known at this location as the low pressure compressor discharge air) flowing from the low pressure compressor 20 to flow into the 2.5 bleed duct 66. The fairing wall 64 provides the core air flow 42 with a bleed air path 68. The bleed air path 68 receives the air flow from the low pressure compressor 20 and flows through the 2.5 bleed duct 66 into the fan duct 52 to join the air flow 40 (also commonly referred to as the fan stream).

Figure 2:
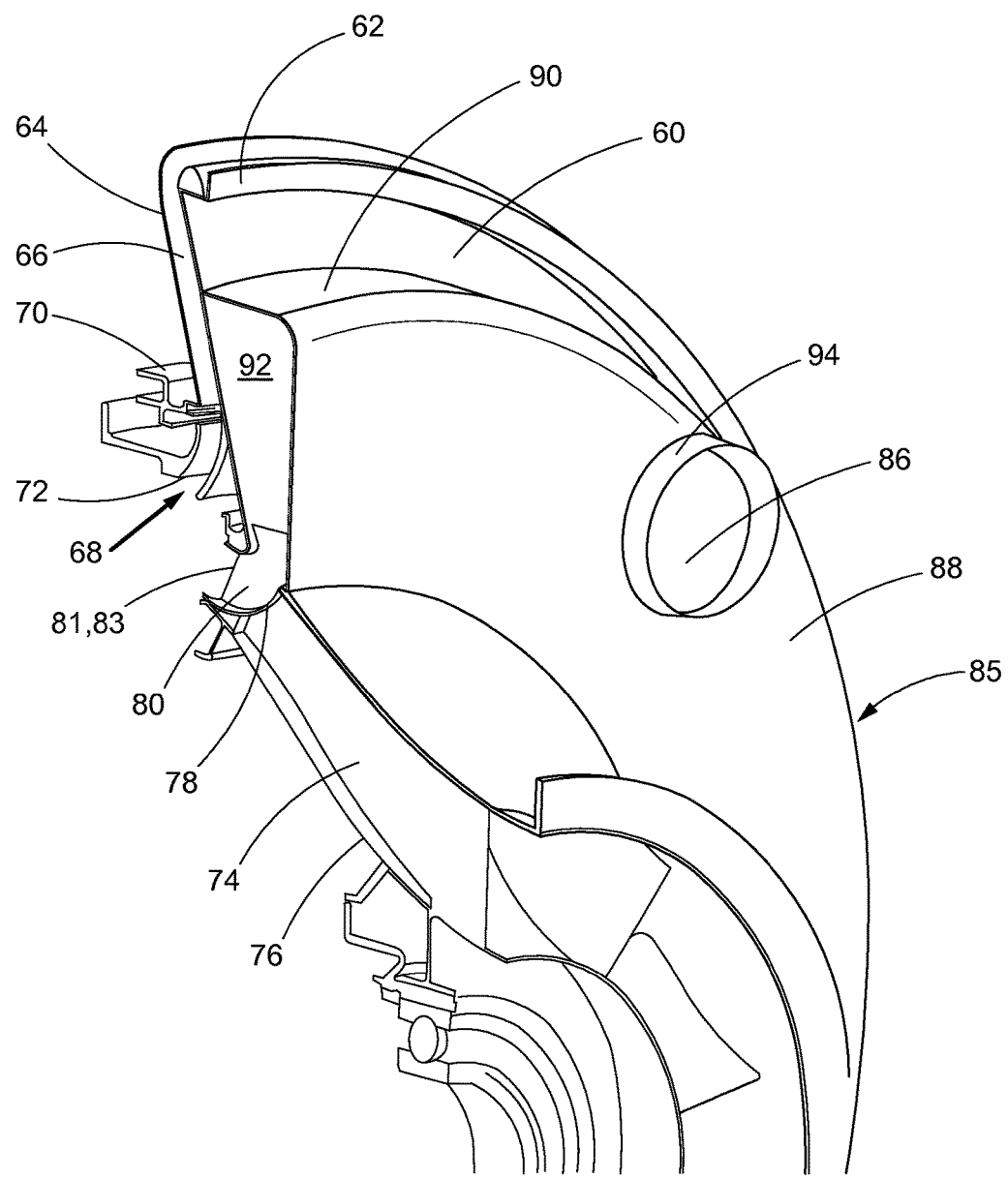
FIG. 2 is an enlarged perspective view of an environmental control system manifold with portions sectioned and broken away to show details of the present disclosure.
Figure 3:
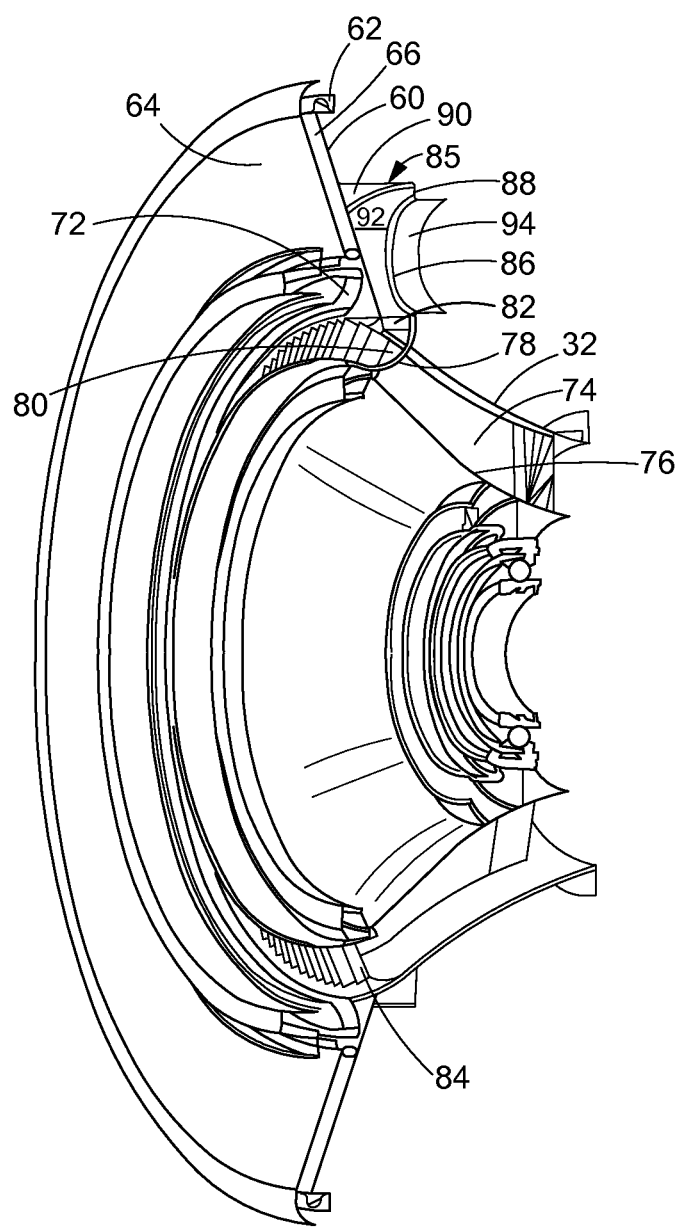
FIG. 3 is a perspective view of an environmental control system manifold with portions sectioned and broken away to show details of the present disclosure.
Figure 4:
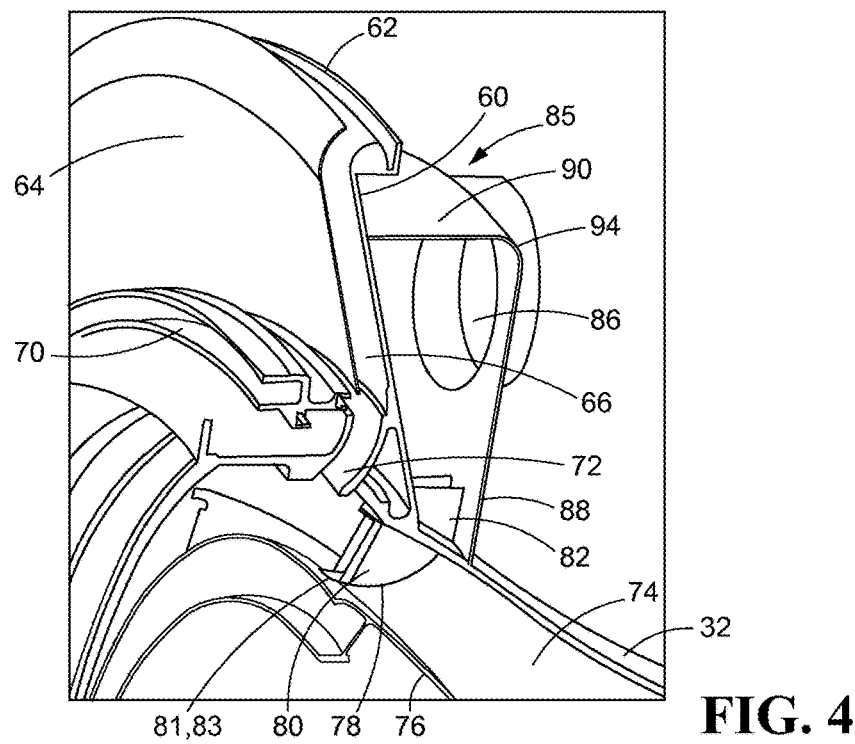
FIG. 4 is an enlarged perspective view of an environmental control system manifold with portions sectioned and broken away to show details of the present disclosure.

A 2.5 stability bleed valve 70 is substantially annular and is in operable association with the fairing wall 64 and the 2.5 bleed duct 66. The 2.5 stability bleed valve 70 is operably movable between an open position (as shown in FIGS. 2-4) and a closed position to control the air flow through the 2.5 bleed duct 66. In the closed position, the 2.5 stability bleed valve 70 prevents any core air flow 42 from flowing into the 2.5 bleed duct 66. In the open position, the stability bleed valve 70 relieves the engine bleed pressure through the bleed air path 68. The position of the 2.5 stability bleed valve 70 may vary between the open and closed position to provide the desired amount of air flow through the 2.5 bleed duct 66. The 2.5 stability bleed valve 70 may be actuated in response to a controller, such as a full authority digital engine control (FADEC).

The 2.5 bleed duct 66 is arranged to the compressor intermediate case 32 forming a first dirt separator 72. During operation, dirt particles moving through the core air flow 42 gather along the compressor intermediate case 32. When the 2.5 stability bleed valve 70 is in the open position, or in a variable position between the opened and closed position, the dirt particles will pass into the bleed air path 68 and exit into the air flow 40, allowing cleaner air to pass downstream toward the high pressure compressor 22.

A plurality of intermediate case struts 74 extend substantially radially inwardly from the compressor intermediate case 32. As a non-limiting example, the plurality of intermediate case struts 74 may include 8 struts, but more or less struts also fit within the scope of the disclosure. The plurality of intermediate case struts 74 joins the compressor intermediate case 32 to an inner engine structure 76 and carries the loads between the inner engine structure 76 and the compressor intermediate case 32. The plurality of intermediate case struts 74 is circumferentially spaced apart from one another in such a way so that the majority of the core air flow 42 flows from the low pressure compressor 20 around the struts 74 to the high pressure compressor 22. Each strut of the plurality of intermediate case struts 74 includes an upstream leading edge 78.

A turning scoop 80 is disposed on the leading edge 78 of each strut of the plurality of intermediate case struts 74. The turning scoop 80 is hollowed and includes a scoop inlet 81 that faces upstream to capture a portion of the core air flow 42 flowing from the low pressure compressor 20. Because the turning scoop 80 is substantially curved, the turning scoop 80 radially turns the portion of core air flow 42 approximately 90 degrees into a corresponding diffuser 82, which is disposed on the surface of the compressor intermediate case 32 that faces the core compartment 50. The turning scoop 80 engages with the corresponding diffuser 82 so that the portion of core air flow 42 flows continuously through the turning scoop 80 into the diffuser 82. The scoop inlet 81 may be offset substantially radially inwardly from the compressor intermediate case 32, to form a second dirt separator 83, so that any dirt particles that bypassed the first dirt separator 72 will pass along the compressor intermediate case 32 and avoid passing into the scoop inlet 81. The second dirt separator 83 facilitates in supplying cleaner air to the environmental control system. A plurality of guide vanes 84 may be disposed upstream of each scoop inlet 81 to remove the swirl from the core air flow 42 before it passes into the turning scoop 80.

Figure 5:
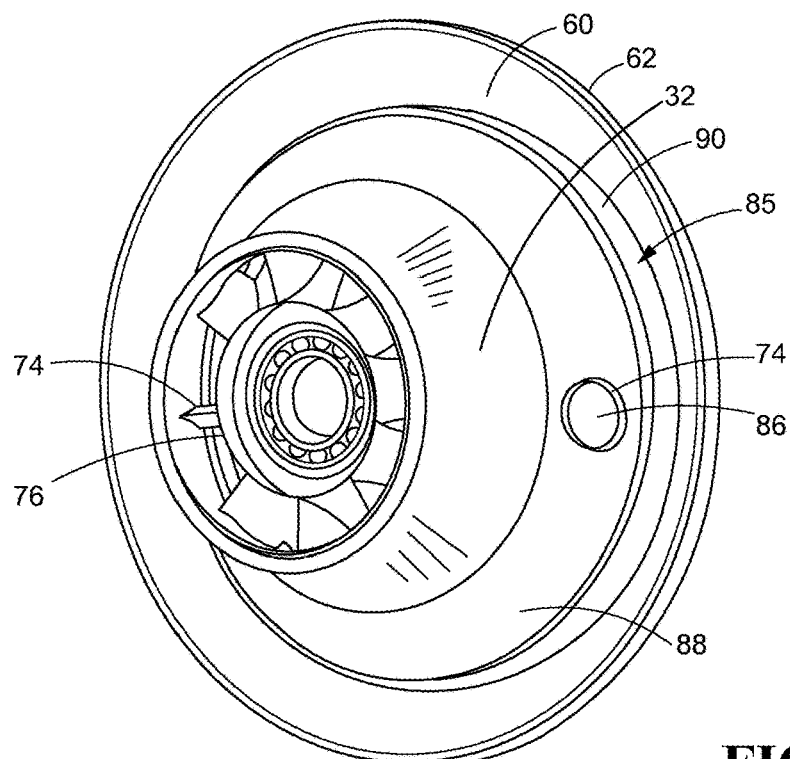
FIG. 5 is a perspective view of an environmental control system manifold, constructed in accordance with the teachings of this disclosure.
Figure 7:
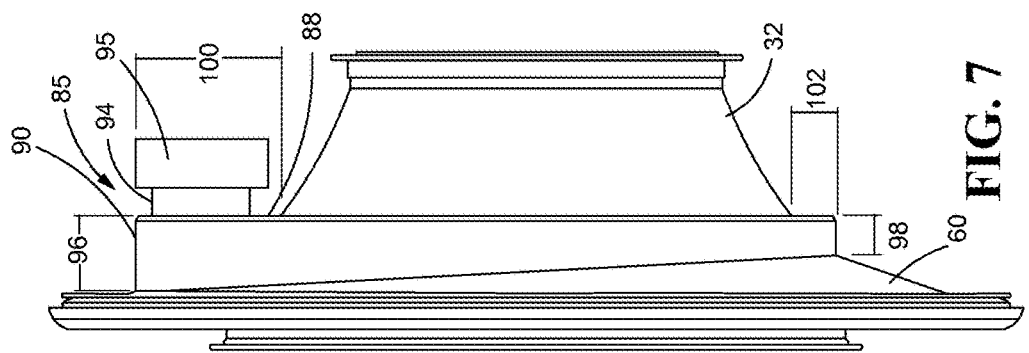
FIG. 7 is a side view of an environmental control system manifold, constructed in accordance with the teachings of this disclosure.
Figure 6:
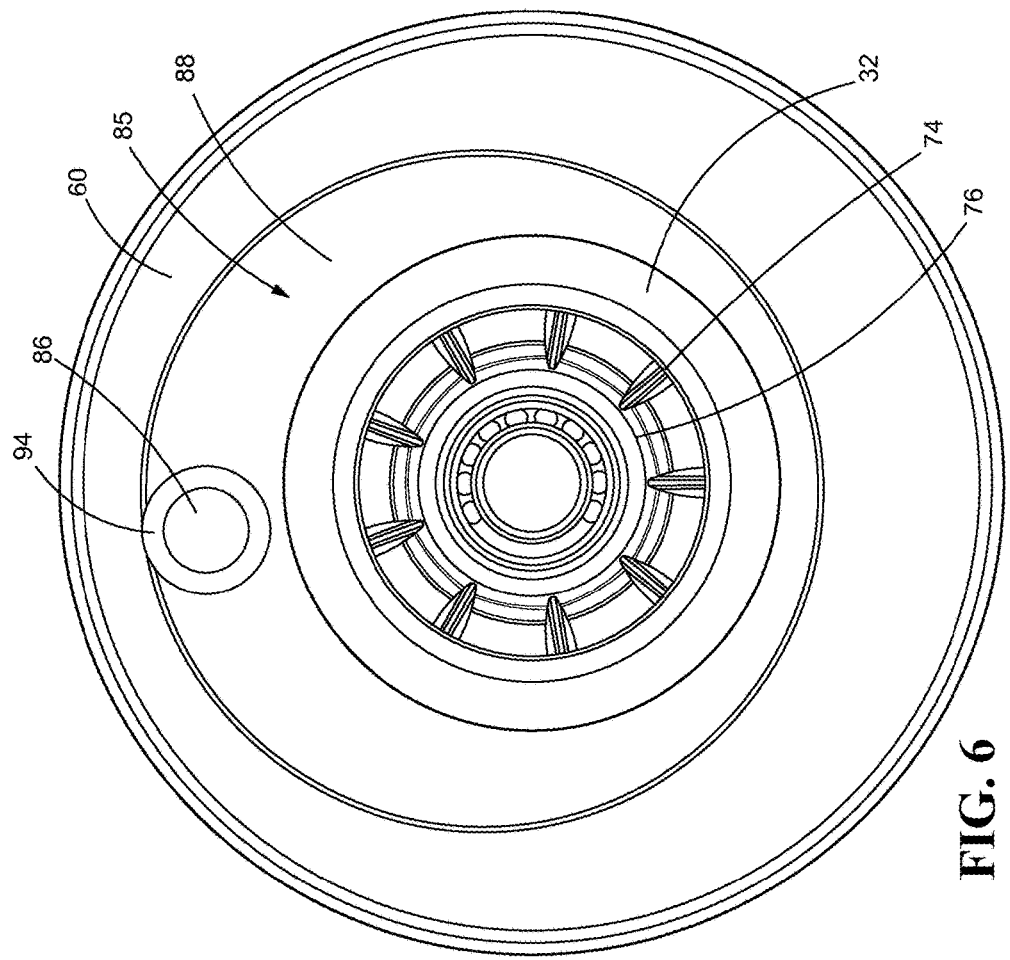
FIG. 6 is plan view of an environmental control system manifold, constructed in accordance with the teaching of this disclosure.

The portion of the core air flow 42 that exits the diffuser 82 feeds into an asymmetrical environmental control system manifold 85, which contains the air for distribution, through an exit port 86, to the environmental control system of an aircraft. As best seen in FIGS. 5-7, the environmental control system manifold 85 is formed of a first collection wall 88 and a second collection wall 90. The first collection wall 88 is substantially annular and extends substantially radially outwardly from the compressor intermediate case 32. The second collection wall 90 is also substantially annular and extends downstream substantially axially from the structural fire wall 60. The first collection wall 88 and the second collection wall 90 intersect to form a smooth bend so that the first and second collection walls 88, 90, the structural fire wall 60 and the compressor intermediate case 32 form an air collection chamber 92 of the environmental control system manifold 85.

The exit port 86 is disposed on the first collection wall 88 and includes an annular rim 94, which extends substantially axially downstream. The exit port 86 may engage a tubing or a piping 95 that transfers the exit air to the environmental control system of the aircraft. Accordingly, the exit port 86 is positioned to accommodate easy attachment of the tubing or piping 95. The exit port 86 may also transfer the exit air to a turbo-compressor.

Furthermore, as best seen in FIG. 7, the downstream extension from the structural fire wall 60 of the second collection wall 90 gradually tapers such that the second collection wall 90 extends a first distance 96 from the fire wall 60 adjacent to the exit port 86 and tapers moving along its circumference until it reaches the area oppositely positioned across the compressor intermediate case 32, where the second collection wall 90 extends a second distance 98 from the fire wall 60 that is less than the first distance 96. In a similar manner, the first collection wall 88 gradually tapers such that the first collection wall 88 extends a third distance 100 from the compressor intermediate case 32 adjacent the exit port 86 and tapers moving along its circumference until it reaches the area oppositely positioned across the compressor intermediate case 32, where the first collection wall 88 extends a fourth distance 102 from the compressor intermediate case 32 that is less than the third distance 100. This asymmetrical configuration of the environmental control system manifold 85 is designed to maintain a balanced air pressure within the collection chamber 92 and prevent an over pressure scenario from occurring.

During operation of the engine 10, the core air flow 42 enters the compressor inlet 34 and flows into the low pressure compressor 20. The core air flow 42 passes through the low pressure compressor 20 and into the compressor intermediate case 32. As the core air flow 42 enters the compressor intermediate case 32, the core air flow 42 may be diverted so that it splits into at least 3 different paths. The core air flow 42 may pass through the 2.5 bleed duct 66 when the 2.5 stability bleed valve 70 is in the open position, or in a variable position between the opened and closed position, and exit into the air flow 40. Accordingly, the dirt particles flowing from the low pressure compressor 20 along the wall of the compressor intermediate case 32 will also flow out through the 2.5 bleed duct 66 and exit into the air flow 40. Alternatively, when the 2.5 stability bleed valve 70 is in the closed position the core air flow 42 will be prevented from flowing into the 2.5 bleed duct 66.

Further, portions of the core air flow 42 pass into each of the turning scoops 80 located on each leading edge 78 of each strut of the plurality of intermediate case struts 74, regardless of whether the 2.5 stability bleed valve 70 is in the open or closed position. Because the scoop inlet 81 is offset substantially radially inwardly from the compressor intermediate case 32 to form a second dirt separator 83, the portions of the core air flow 42 through the turning scoops 80 are much cleaner air. The curved structure of each turning scoop 80 radially turns the core air flow 42 approximately 90 degrees allowing the core air flow 42 to pass into corresponding diffusers 82, which slow down the core air flow 42 before entering into the environmental control system manifold 85. The core air flow 42 that is collected in the collection chamber 92 of the environmental control system manifold 85 then flows through the exit port 86 and to the environmental control system of the aircraft.

The majority of the core air flow 42, which does not pass into the 2.5 bleed duct 66 or the turning scoops 80, travels between each strut of the plurality of intermediate case struts 74 and toward the high pressure compressor 22.

Figure 8:
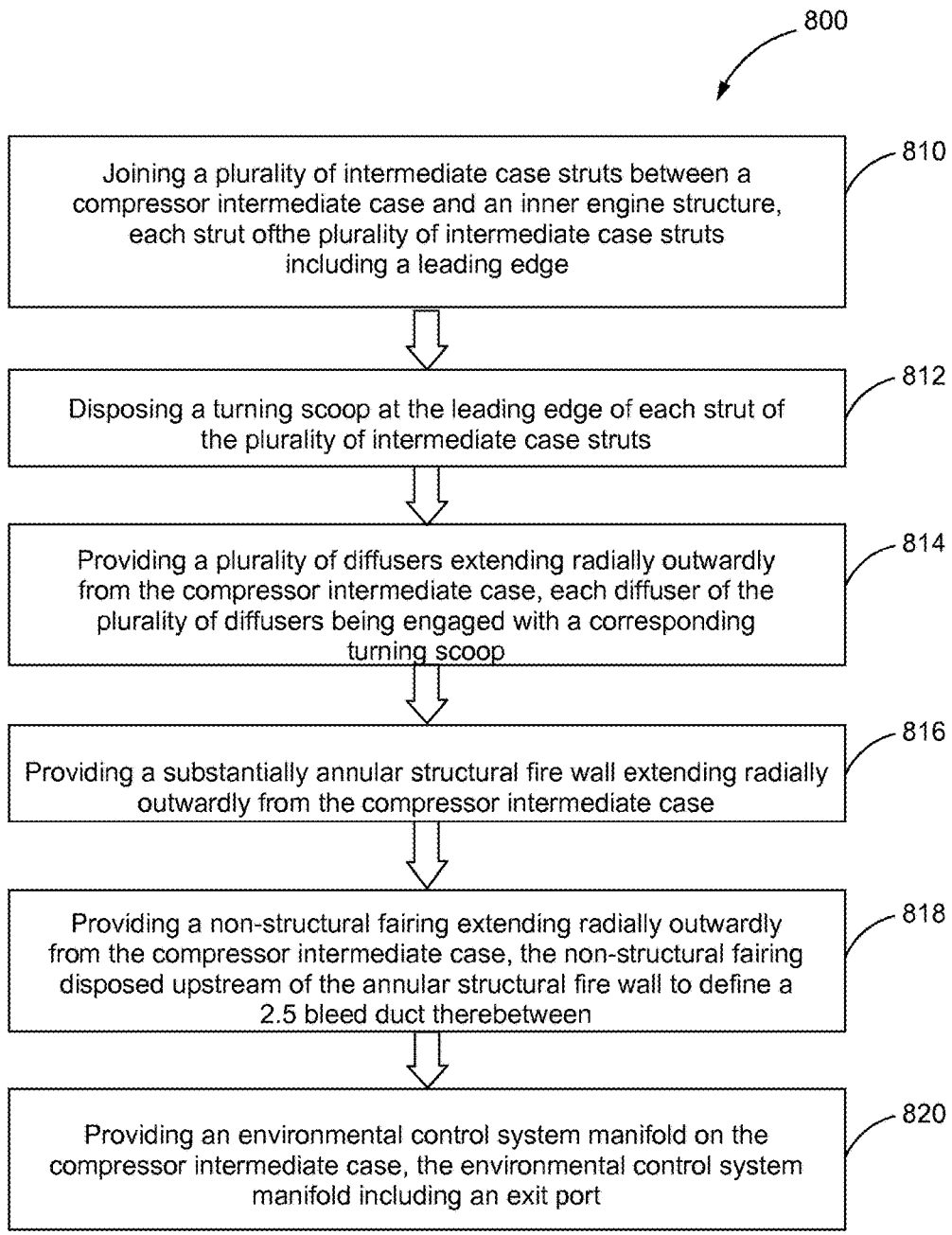
FIG. 8 is a flowchart illustrating a sample sequence of steps which may be practiced in accordance with the teachings of this disclosure.

FIG. 8 illustrates a flowchart 800 of a sample sequence of steps which may be performed to of provide cleaner environmental control system bleed air, which exits a gas turbine engine, so that there is minimal disruption to a core air flow. Box 810 shows the step of joining a plurality of intermediate case struts between a compressor intermediate case and an inner engine structure. Each strut of the plurality of intermediate case struts includes a leading edge. Another step, as illustrated in box 812, is disposing a turning scoop at the leading edge of each strut of the plurality of intermediate case struts. Box 814 illustrates the step of providing a plurality of diffusers extending radially outwardly from the compressor intermediate case. Each diffuser of the plurality of diffusers engages with a corresponding turning scoop. Yet another step, as shown in box 816, is providing a substantially annular structural fire wall extending radially outwardly from the compressor intermediate case.

As shown in box 818, another step is providing a non-structural fairing extending radially outwardly from the compressor intermediate case. The non-structural fairing is disposed upstream of the annular structural fire wall to define a 2.5 bleed duct therebetween. Box 820 illustrates the step of providing an environmental control system manifold on the compressor intermediate case. The environmental control system manifold includes an exit port. Another step may be providing an upstream-facing scoop inlet onto the turning scoop so that the scoop inlet is offset substantially radially inwardly from the compressor intermediate case, forming a second dirt separator. The environmental control system manifold may be asymmetrical so that the environmental control system manifold is formed of a substantially annular first and second collection wall. The first collection wall may extend substantially radially outwardly from the compressor intermediate case while the second collection wall may extend downstream substantially axially from the structural fire wall. The first and second collection walls intersect to form a smooth bend. The exit port may be disposed on the first collection wall. The second collection wall may extend a first distance from the fire wall adjacent to the exit port and tapers moving along its circumference until it reaches an area oppositely positioned across the compressor intermediate case, where the second collection wall may extend a second distance from the fire wall that is less than the first distance. The first collection wall may extend a third distance from the compressor intermediate case adjacent the exit port and tapers moving along its circumference until it reaches the area oppositely positioned across the compressor intermediate case, where the first collection wall may extend a fourth distance from the compressor intermediate case that is less than the third distance.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth an environmental control system manifold integrated with the station 2.5 compressor intermediate case. The teachings of this disclosure can be employed to provide cleaner air to the environmental control system of an aircraft. Moreover, through the novel teachings set forth above, the cleaner air can be provided with minimal disruption to the core air flow. Furthermore, the present disclosure provides a structural fire wall having a V-groove that can support the core engine cowl.

What is claimed is:

1. An intermediate case for a gas turbine engine compressor, the intermediate case comprising:
    a plurality of intermediate case struts joining the intermediate case to an inner engine structure, each strut of the plurality of intermediate case struts including a leading edge;
    a turning scoop being disposed at the leading edge of each strut of the plurality of intermediate case struts;
    a plurality of diffusers extending radially outwardly from the intermediate case, each diffuser of the plurality of diffusers being engaged with a corresponding turning scoop;
    an annular structural fire wall extending radially outwardly from the intermediate case; and an environmental control system manifold being disposed on the intermediate case, the environmental control system manifold including an exit port.

2. The intermediate case of claim 1, further including a non-structural fairing extending radially outwardly from the intermediate case, the non-structural fairing disposed upstream of the fire wall to define a 2.5 bleed duct therebetween.

3. The intermediate case of claim 2, further including a 2.5 stability bleed valve in operable association with the non-structural fairing and the 2.5 bleed duct, the 2.5 stability bleed valve operably movable between an open and closed position.

4. The intermediate case of claim 2, wherein the 2.5 bleed duct extends from the intermediate case forming a first dirt separator.

5. The intermediate case of claim 1, wherein each turning scoop includes an upstream-facing scoop inlet, the scoop inlet being offset substantially radially inwardly from the intermediate case forming a second dirt separator.

6. The intermediate case of claim 1, wherein the environmental control system manifold is asymmetrical.

7. The intermediate case of claim 6, wherein the environmental control system manifold is formed of a substantially annular first and second collection wall, the first collection wall extends substantially radially outwardly from the intermediate case, the second collection wall extends downstream substantially axially from the fire wall, the first and second collection walls intersect to form a smooth bend, the exit port being disposed on the first collection wall, the second collection wall extends a first distance from the fire wall adjacent to the exit port and tapers moving along its circumference until it reaches an area oppositely positioned across the intermediate case, where the second collection wall extends a second distance from the fire wall that is less than the first distance, the first collection wall extends a third distance from the intermediate case adjacent the exit port and tapers moving along its circumference until it reaches the area oppositely positioned across the intermediate case, where the first collection wall extends a fourth distance from the intermediate case that is less than the third distance.

8. A gas turbine engine, the engine comprising:
a compressor intermediate case;
a plurality of intermediate case struts joining the compressor intermediate case to an inner engine structure, each strut of the plurality of intermediate case struts including a leading edge;
a turning scoop being disposed at the leading edge of each strut of the plurality of intermediate case struts;
a plurality of diffusers extending radially outwardly from the compressor intermediate case, each diffuser of the plurality of diffusers being engaged with a corresponding turning scoop;
an annular structural fire wall extending radially outwardly from the compressor intermediate case; and
an environmental control system manifold being disposed on the compressor intermediate case, the environmental control system manifold including an exit port.

9. The gas turbine engine of claim 8, further including a non-structural fairing extending radially outwardly from the compressor intermediate case, the non-structural fairing disposed upstream of the fire wall to define a 2.5 bleed duct therebetween.

10. The gas turbine engine of claim 9, further including a 2.5 stability bleed valve in operable association with the non-structural fairing and the 2.5 bleed duct, the 2.5 stability bleed valve operably movable between an open and closed position.

11. The gas turbine engine of claim 9, wherein the 2.5 bleed duct extends from the compressor intermediate case forming a first dirt separator.

12. The gas turbine engine of claim 8, wherein each turning scoop includes an upstream-facing scoop inlet, the scoop inlet being offset substantially radially inwardly from the compressor intermediate case forming a second dirt separator.

13. The gas turbine engine of claim 8, wherein the environmental control system manifold is asymmetrical.

14. The gas turbine engine of claim 13, wherein the environmental control system manifold is formed of a substantially annular first and second collection wall, the first collection wall extends substantially radially outwardly from the compressor intermediate case, the second collection wall extends downstream substantially axially from the fire wall, the first and second collection walls intersect to form a smooth bend, the exit port being disposed on the first collection wall, the second collection wall extends a first distance from the fire wall adjacent to the exit port and tapers moving along its circumference until it reaches an area oppositely positioned across the compressor intermediate case, where the second collection wall extends a second distance from the fire wall that is less than the first distance, the first collection wall extends a third distance from the compressor intermediate case adjacent the exit port and tapers moving along its circumference until it reaches the area oppositely positioned across the compressor intermediate case, where the first collection wall extends a fourth distance from the compressor intermediate case that is less than the third distance.

15. The gas turbine engine of claim 8, further including a v-groove disposed on the fire wall, the V-groove securely interfaces with a core engine cowl.

16. The gas turbine engine of claim 12, further including a plurality of guide vanes disposed upstream of each scoop inlet.

17. A method of providing cleaner environmental control system bleed air, which exits a gas turbine engine, so that there is minimal disruption to a core air flow, the method comprising:
joining a plurality of intermediate case struts between a compressor intermediate case and an inner engine structure, each strut of the plurality of intermediate case struts including a leading edge;
disposing a turning scoop at the leading edge of each strut of the plurality of intermediate case struts;
providing a plurality of diffusers extending radially outwardly from the compressor intermediate case, each diffuser of the plurality of diffusers being engaged with a corresponding turning scoop;
providing an annular structural fire wall extending radially outwardly from the compressor intermediate case;
providing a non-structural fairing extending radially outwardly from the compressor intermediate case, the non-structural fairing disposed upstream of the annual structural fire wall to define a 2.5 bleed duct therebetween; and
providing an environmental control system manifold on the compressor intermediate case, the environmental control system manifold including an exit port.

18. The method of claim 17, further including providing an upstream-facing scoop inlet onto each turning scoop, each scoop inlet being offset substantially radially inwardly from the compressor intermediate case forming a second dirt separator.

19. The method of claim 17, wherein the environmental control system manifold is asymmetrical.

20. The method of claim 19, wherein the environmental control system manifold is formed of a substantially annular first and second collection wall, the first collection wall extends substantially radially outwardly from the compressor intermediate case, the second collection wall extends downstream substantially axially from the fire wall, the first and second collection walls intersect to form a smooth bend, the exit port being disposed on the first collection wall, the second collection wall extends a first distance from the fire wall adjacent to the exit port and tapers moving along its circumference until it reaches an area oppositely positioned across the compressor intermediate case, where the second collection wall extends a second distance from the fire wall that is less than the first distance, the first collection wall extends a third distance from the compressor intermediate case adjacent the exit port and tapers moving along its circumference until it reaches the area oppositely positioned across the compressor intermediate case, where the first collection wall extends a fourth distance from the compressor intermediate case that is less than the third distance.

* * * * *